(12) United States Patent
Fan et al.

(10) Patent No.: US 12,116,314 B1
(45) Date of Patent: Oct. 15, 2024

(54) DEVICE AND METHOD FOR IMPROVING THE TOUGHNESS OF CONCRETE BY SOLVING FIBER AGGLOMERATION

(71) Applicants: ZHENGZHOU UNIVERSITY, Zhengzhou (CN); SOUTHERN MARINE SCIENCE AND ENGINEERING GUANGDONG LABORATORY (GUANGZHOU), Guangzhou (CN); NANJING HYDRAULIC RESEARCH INSTITUTE, MEE, Nanjing (CN)

(72) Inventors: Xiangqian Fan, Zhengzhou (CN); Tao Wang, Nanjing (CN); Shaowei Hu, Zhengzhou (CN); Li Zou, Guangzhou (CN); Jueding Liu, Guangzhou (CN); Jun Lu, Nanjing (CN)

(73) Assignees: ZHENGZHOU UNIVERSITY, Zhengzhou (CN); SOUTHERN MARINE SCIENCE AND ENGINEERING GUANGDONG LABORATORY (GUANGZHOU), Guangzhou (CN); NANJING HYDRAULIC RESEARCH INSTITUTE, MEE, Nanjing (CN)

( * ) Notice: Subject to any disclaimer, the term of this patent is extended or adjusted under 35 U.S.C. 154(b) by 0 days.

(21) Appl. No.: 18/668,296

(22) Filed: May 20, 2024

(51) Int. Cl.
| | |
|---|---|
| C04B 20/10 | (2006.01) |
| B05B 12/02 | (2006.01) |
| B28C 5/40 | (2006.01) |
| C04B 14/04 | (2006.01) |
| C04B 14/06 | (2006.01) |
| C04B 22/06 | (2006.01) |
| C04B 28/08 | (2006.01) |
| C04B 40/00 | (2006.01) |
| D06M 15/03 | (2006.01) |

(52) U.S. Cl.
CPC ......... *C04B 20/1048* (2013.01); *B05B 12/02* (2013.01); *B28C 5/404* (2013.01); *C04B 14/048* (2013.01); *C04B 14/062* (2013.01); *C04B 14/068* (2013.01); *C04B 22/062* (2013.01); *C04B 28/08* (2013.01); *C04B 40/0046* (2013.01); *D06M 15/03* (2013.01); *D06M 2200/00* (2013.01)

(58) Field of Classification Search
CPC ..... B05B 12/02; B28C 5/404; C04B 20/1048; C04B 14/048; C04B 14/062; C04B 14/068; C04B 22/062; C04B 28/08; C04B 40/0046; D06M 15/03; D06M 2200/00
See application file for complete search history.

(56) References Cited

FOREIGN PATENT DOCUMENTS

| | | |
|---|---|---|
| CN | 106365576 A | 2/2017 |
| CN | 106626071 A | 5/2017 |
| CN | 112408920 A | 2/2021 |
| JP | 2005075703 A | 3/2005 |
| JP | 2005343770 A | 12/2005 |

*Primary Examiner* — Anthony J Green
(74) *Attorney, Agent, or Firm* — CBM PATENT CONSULTING, LLC

(57) ABSTRACT

A process involves adding charged fibers with surface-cured "temperature-sensitive gel" during the preparation of concrete; preparing charged fibers with surface-cured "temperature-sensitive gel" by spraying, which envelops the charged fibers with a layer of "temperature-sensitive gel"; then solidifying the temperature-sensitive gel layer on the surface of the charged fibers by adjusting the environmental temperature. Utilizing the physical state of the temperature-sensitive gel at different temperatures, the "temperature-sensitive gel" wraps around the charged fibers to form an insulating layer. This prevents the scattering of the charged fibers due to charge repulsion during their introduction into the concrete preparation process, ensuring they are evenly distributed.

7 Claims, 1 Drawing Sheet

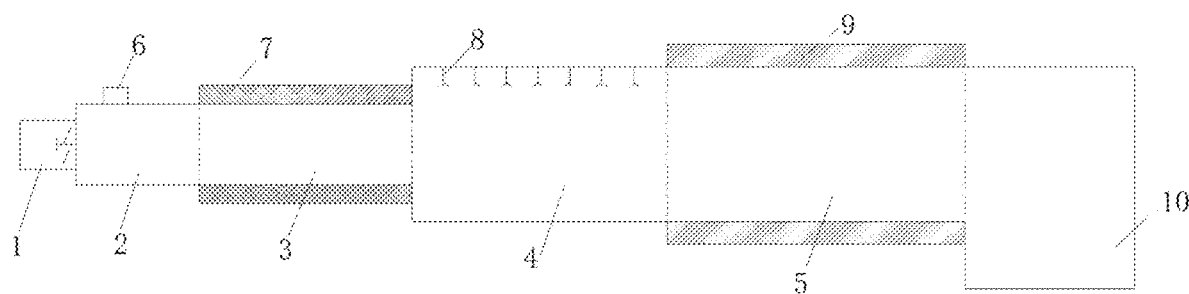

DEVICE AND METHOD FOR IMPROVING THE TOUGHNESS OF CONCRETE BY SOLVING FIBER AGGLOMERATION

FIELD OF TECHNOLOGY

This invention relates to a method for preparing high-toughness concrete, specifically involving a device and method for improving the toughness of concrete by solving fiber agglomeration, belonging to the technical field of building materials.

BACKGROUND TECHNOLOGY

With the rapid development of China's water conservancy and hydropower industry, there is an increasing number of high dam projects, and the service environment faced by spillway structures is becoming more complex, gradually presenting a trend of high water heads and large flow volumes. During the high-speed flow of water, due to sudden changes in the local environment causing poor water flow patterns, a large amount of cavitation is formed and collapses on the surface of concrete structures. The cavitation bubble groups generate high-frequency, sustained pulse loads upon collapsing on the concrete structure surface, which can cause fatigue damage to the materials and lead to cavitation erosion.

Currently, the concrete used in spillway structures generally has a strength grade of around C25, which is not sufficiently tough and has high carbon emissions. Once cavitation erosion occurs, it poses a serious threat to the normal use of hydraulic structures. Moreover, with the commencement of several 300 m-level high dam projects in some regions, the problem of cavitation erosion in hydraulic structures has become more prominent. Hydraulic structures generally adopt special anti-cavitation structural designs and apply anti-cavitation coatings to address the issue of concrete cavitation erosion. On one hand, the fixed anti-cavitation structural designs in hydraulic structures often cannot provide good protection due to the variable flow patterns; on the other hand, the applied anti-cavitation coatings are easily contaminated by the underwater environment, leading to the loss of adhesion between the coating and the concrete structure, rendering them ineffective. Therefore, it is necessary to target the complex service environment and start with the mechanical properties of the material itself to enhance the strength and toughness of the concrete, thereby optimizing the cavitation erosion resistance of concrete structures.

The addition of fibers is an effective means to enhance the toughness of concrete. Due to the aspect ratio and van der Waals forces, fibers inevitably clump together, and good dispersion of fibers is key to ensuring improved concrete toughness. To improve the dispersion of fibers in concrete, researchers have proposed many methods. For example, the patent application with public number CN106626071A disclosed a method of dispersing fibers by attaching like charges to them. Although this method is simple and effective, it has the following issues: after the fiber surface is attached with strong charges, the fibers spread apart due to the repulsion of like charges, and before entering the concrete, the fibers are uncontrolled, making it difficult to effectively introduce them into the mixer.

Therefore, it is necessary to improve the treatment of charged fibers to facilitate their effective incorporation into concrete and ensure the enhancement of concrete toughness.

SUMMARY OF THE INVENTION

To address the shortcomings of the existing technology, the purpose of this invention is to provide a device and method for improving the toughness of concrete by solving fiber agglomeration.

In order to achieve the above objectives, the invention adopts the following technical scheme:

A method for improving the toughness of concrete by solving fiber agglomeration involves adding charged fibers with surface-cured "temperature-sensitive gel" during the preparation process of concrete to produce high-toughness concrete.

The preparation of the charged fibers with surface-cured "temperature-sensitive gel" involves wrapping the charged fibers' surfaces with "temperature-sensitive gel" through spraying, followed by solidifying the temperature-sensitive gel layer on the surface of the charged fibers by adjusting the environmental temperature.

The thickness of the aforementioned temperature-sensitive gel layer is 1-2 mm.

The aforementioned temperature-sensitive gel includes carrageenan and gelatin.

The preparation process of the aforementioned concrete includes:
  S1: By mass portions, dry-mixing precursor powder, fine aggregate, coarse aggregate, and reinforcing components in a mixing device, then adding the charged fibers with surface-cured "temperature-sensitive gel" into the mixing device for dry-mixing to produce a dry-blended material;
  S2: By mass portions, pour an alkali-activated mixed solution into the mixing device, stirring and discharging to produce concrete.

Further, the aforementioned mass portions include 300-500 parts of precursor powder, 500-800 parts of fine aggregate, 700-1200 parts of coarse aggregate, 5-20 parts of reinforcing components, 10-25 parts of alkali-activated mixed solution, and charged fibers with surface-cured "temperature-sensitive gel" at a volume fraction of 0.1-2%.

The dry-mixing and stirring time is 120-180 seconds.

Further, the precursor powder includes aluminosilicate materials, which comprise one or more types of fly ash and slag;
  The reinforcing components include microsilica;
  The alkali-activated mixed solution is prepared by mixing water glass, sodium hydroxide, alkaline powder, and water in a certain mass ratio, wherein the alkaline powder is obtained by grinding, screening, and high-temperature activation of alkaline solid waste;
  The fine aggregate includes river sand;
  The coarse aggregate includes graded broken stone.

Furthermore, the mass ratio of water glass, sodium hydroxide, alkaline powder, and water is (2-5):(1-2):(0.5-1):(1-2).

A device for improving the toughness of concrete by solving fiber agglomeration includes, along the transverse direction, a continuous-cavity spraying bin and a curing bin;
  The cavity top of the spraying bin is equipped with several sprinkler heads for sprinkling the temperature-sensitive gel;
  The curing bin is equipped with a temperature-regulating device for adjusting the internal temperature of the curing bin.

Along the transverse direction, the opening of the aforementioned spraying bin is attached to a charge attachment bin, which is used to attach charges to drifting fibers.

Along the transverse direction, the opening of the aforementioned charge attachment bin is connected to a feeding bin, whose opening is equipped with a fan and whose top has a feed inlet.

The advantages of this invention include:

The device and method of this invention for improving the toughness of concrete by solving fiber agglomeration utilize the physical state of "temperature-sensitive gel" at different temperatures to wrap around the charged fibers forming an "insulating layer," solidifying both the charge and the fibers, thus preventing the dispersion of charged fibers due to charge repulsion during the delivery process and avoiding fiber agglomeration. After dispersing them into the concrete, the "insulating layer" melts under the exothermic effect of concrete hydration, and the charged fibers exhibit repulsion again under the strong charge, ensuring good dispersion of the added fibers within the concrete, as well as the stability and uniformity of the improved concrete toughness.

The device and method of this invention for improving the toughness of concrete by solving fiber agglomeration are simple in structure, convenient to use, with excellent curing effects on charged fibers, effectively enhancing the utilization of charged fibers, demonstrating strong practicality and broad applicability.

BRIEF DESCRIPTION OF THE DRAWINGS

FIG. is a schematic diagram of the structure for curing charged fibers.

The labels in the drawings have the following meanings: 1, fan; 2, feeding bin; 3, charge attachment bin; 4, spraying bin; 5, curing bin; 6, feed inlet; 7, charge emitting device; 8, sprinkler head; 9, temperature control device; 10, collection bin.

DETAILED EMBODIMENT

The following is a detailed introduction to the invention in combination with the drawings and specific embodiments.

A method for improving the toughness of concrete by solving fiber agglomeration:

The formulation of high-toughness concrete, by mass portions, consists of 300-500 parts of precursor powder, 500-800 parts of fine aggregate, 700-1200 parts of coarse aggregate, 5-20 parts of reinforcing components, 150-250 parts of alkali-activated mixed solution, and charged fibers with surface-cured "temperature-sensitive gel" at a volume fraction of 0.1%-2%.

Precursor powder: Select and put aluminosilicate materials such as fly ash, and slag into a high-temperature furnace at 300-800° C. for high-temperature activation, quickly cool to a constant weight, then grind into powder to obtain precursor powder with certain fineness and activity, with a preferred particle size of 0.01-0.05 mm.

Reinforcing components: Micro silica with an average particle size of 0.1~0.3 um.

Alkali-activated mixed solution: Select alkaline solid waste slag (one or more types from calcium carbide slag, plant ash, and red mud), grind the residue, then put the ground alkaline powder into a high-temperature furnace at 350° C. for high-temperature activation to obtain alkaline powder with certain fineness and activity. Mix water glass, sodium hydroxide, alkaline powder, and water according to the mass ratio of (2-5:1-2:0.5-1:1-2), stir to prepare the alkali-activated mixed solution.

Preparation of surface-cured "temperature-sensitive gel":

A1. Preparation device:

As shown in FIG. 1, the device consists of a feeding bin, a charge attachment bin, a spraying bin, a curing bin, and a collection bin, which are connected along the transverse direction. The feeding bin has a fan at its opening, with airflow passing through the feeding bin, charge attachment bin, spraying bin, curing bin, to the collection bin in sequence.

The top of the feeding bin is equipped with a feed inlet for fiber placement.

The charge attachment bin is equipped with a charge emitting device to emit charges into the cavity, allowing the fiber surfaces to acquire strong like-charges, resulting in charged fibers.

The top of the spraying bin is fitted with several sprinkler heads for sprinkling the temperature-sensitive gel; this allows the charged fibers to be wrapped in a layer of the temperature-sensitive gel.

The curing bin is equipped with a temperature control device to regulate the internal temperature of the curing bin, causing the temperature-sensitive gel layer wrapping the charged fibers to cool and solidify.

Preferably, the internal diameter of the spraying bin is not less than that of the curing bin.

A2. Preparation method:

Use the fan's airflow as the driving force to blow the fibers that have been placed into the feeding bin.

The drifting fibers enter the charge attachment bin, where charges emitted by the charge emitting device attach strong like-charges to the fiber surfaces, creating charged fibers.

Under the force of the airflow, the charged fibers drift into the spraying bin, where the sprinkler heads uniformly spray a layer of "temperature-sensitive gel (carrageenan, gelatin)" onto the surface of the charged fibers. By adjusting the power of the fan, the spraying duration for the charged fibers can be indirectly controlled; by regulating the spraying time, the thickness of the gel on the surface of the charged fibers can be controlled to reach 1-2 mm, achieving an effective isolation thickness.

The charged fibers coated with "temperature-sensitive gel" drift into the curing bin under the airflow. By adjusting the temperature, the gel on the surface of the charged fibers solidifies at low temperatures, forming an "insulating layer," and finally, the charged fibers with a surface-cured "temperature-sensitive gel" are obtained in the collection bin.

Preparation method for high-toughness concrete:

B1: By mass portions, weigh 300-500 parts of precursor powder, 500-800 parts of fine aggregate, 700-1200 parts of coarse aggregate, and 5-20 parts of reinforcing components into a mixing device for dry mixing for 120-180 s. Then add charged fibers with a volume fraction of 0.1%-2% surface-cured "temperature-sensitive gel" to the mixing device for another 120-180 s of dry mixing to evenly distribute the fibers, thus preparing the dry mixed material.

B2: Pour 150-250 parts of the alkali-activated mixed solution into the mixing device all at once, and mix for 150 s. During the mixing process, under the action of friction and exothermic hydration, the "insulating layer" melts, releasing the charged fibers again, allowing them to be mixed into the concrete. The melted "temperature-sensitive gel" also mixes into the concrete, becoming a colloidal substance that aids in the concreting of the mixture; then discharge to obtain concrete mixed with charged fibers.

Example 1

Mix water glass, sodium hydroxide, calcium carbide slag powder, and water in a mass ratio of 5:1.5:0.5:1 to prepare an alkali-activated mixed solution.

By mass portions, take 373 parts of fly ash, 93 parts of blast furnace slag, and 10 parts of micro-silica, and dry mix for 150 s; add 681 parts of river sand and 1034 parts of graded broken stone, and dry mix for 120 s; then mix in 210 parts of the alkali-activated mixed solution and stir for 150 s before discharging.

Example 2

Use carrageenan as the temperature-sensitive gel.

Mix water glass, sodium hydroxide, calcium carbide slag powder, and water in a mass ratio of 5:1.5:0.5:1 to prepare an alkali-activated mixed solution.

By mass portions, take 373 parts of fly ash, 93 parts of blast furnace slag, and 10 parts of micro silica, and dry mix for 150 s; add 681 parts of river sand and 1034 parts of graded broken stone, and dry mix for 120 s; then add charged fibers with a volume fraction of 2% surface-cured "temperature-sensitive gel" and dry mix for 150 s; next, mix in 210 parts of alkali-activated mixed solution, stir for 150 s, and then discharge.

COMPARATIVE EXAMPLE

Based on the same formulation as Example 2, charge fibers with an equal amount (surface not cured "temperature-sensitive gel") are added.

Measure the performance of the concrete specimens obtained after standard curing from Examples 1-2 and the comparative example. Concrete performance testing:

1. Determine the compressive strength of specimens from each example according to the "Standard Test Method for Mechanical Properties of Concrete GB/T50081-2019" using a 2000 kN microcomputer-controlled compression testing machine produced by Shanghai Hualong Testing Instrument Co., Ltd. Following the test specifications, the loading rate is 0.5 MPa/s, and the results are shown in Table 1.
2. Determine the splitting tensile strength of specimens from each example in accordance with the "Standard Test Method for Mechanical Properties of Concrete GB/T50081-2019" using the 2000 kN microcomputer-controlled compression testing machine produced by Shanghai Hualong Testing Instrument Co., Ltd. Following the test specifications, the loading rate is 0.05 MPa/s, and the results are shown in Table 1.
3. Determine the flexural strength of specimens from each example in compliance with the "Standard Test Method for Mechanical Properties of Concrete GB/T50081-2019" using the 2000 kN microcomputer-controlled compression testing machine produced by Shanghai Hualong Testing Instrument Co., Ltd. Following the test specifications, the loading rate is 0.05 MPa/s, and the results are shown in Table 1.

Characterize the concrete toughness by the splitting-to-compressive ratio and flexural-to-compressive ratio. The higher these values, the greater the toughness of the concrete.

TABLE 1

| | Compressive strength/ MPa | Split tensile strength/ MPa | Flexural strength/ MPa | splitting-to-compressive ratio | flexural-to-compressive ratio |
|---|---|---|---|---|---|
| Example 1 | 41.27 | 3.79 | 5.23 | 0.09 | 0.13 |
| Example 2 | 56.73 | 8.25 | 12.46 | 0.15 | 0.22 |
| Comparative Example | 48.46 | 5.73 | 7.25 | 0.12 | 0.15 |

For practical use, other types of temperature-sensitive gels may be selected based on the needs of the application, and the concrete formulation can be adjusted to achieve the desired performance characteristics.

The above description and examples illustrate the basic principles, main features, and advantages of the present invention. Those skilled in the art will understand that the embodiments described do not limit the invention in any way. Any technical solutions obtained by equivalent substitution or transformation are within the scope of the present invention's protection.

What is claimed is:

1. A method for improving toughness of concrete by solving fiber agglomeration, wherein charged fibers with surface-cured "temperature-sensitive gel" are added into a concrete to generate a high-toughness concrete; wherein the charged fibers are prepared by making a surface of a charged fiber being enveloped with a layer of the "temperature-sensitive gel" with a spraying process, and the layer of the "temperature-sensitive gel layer" is solidified by adjusting an environmental temperature.

2. The method according to claim 1, wherein a thickness of the layer of the "temperature-sensitive gel layer" is 1-2 mm.

3. The method according to claim 1, wherein the "temperature-sensitive gel" comprises carrageenan and gelatin.

4. The method according to claim 1, wherein the preparation process of the high-toughness concrete includes:
   S1. in terms of mass portions, put precursor powder, fine aggregate, coarse aggregate, and reinforcement components into a mixing device for dry mixing, then add charged fibers with surface-cured "temperature-sensitive gel" into the mixing device for dry mixing to produce dry-mixed materials; and
   S2. in terms of mass portions, pour the alkali-activated mixed solution into the mixing device, mix and discharge to produce high-toughness concrete.

5. The method according to claim 4, wherein the mass portions include 300-500 parts of precursor powder, 500-800 parts of fine aggregate, 700-1200 parts of coarse aggregate, 5-20 parts of reinforcement components, 10-25 parts of alkali-activated mixed solution, and charged fibers with surface-cured "temperature-sensitive gel" at a volume fraction of 0.1-2%; the dry mixing and stirring time is 120-180 s.

6. The method according to claim 5, wherein the precursor powder includes aluminosilicate materials, which comprise one or more types of fly ash and slag;
   the reinforcement component includes microsilica;
   the alkali-activated mixed solution is made by mixing water glass, sodium hydroxide, alkaline powder, and water at a certain mass ratio, wherein the alkaline powder is obtained by grinding, sieving, and high-temperature activation of alkaline solid waste;
   the fine aggregate includes river sand; and
   the coarse aggregate includes graded broken stone.

7. The method according to claim 6, wherein the mass ratio of water glass, sodium hydroxide, alkaline powder, and water is (2-5):(1-2):(0.5-1):(1-2).

\* \* \* \* \*